United States Patent
Godlewski

(10) Patent No.: US 7,697,429 B2
(45) Date of Patent: Apr. 13, 2010

(54) ENHANCING A CONFIGURATION FILE

(75) Inventor: Marcin Godlewski, Lawrenceville, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 946 days.

(21) Appl. No.: 11/456,322

(22) Filed: Jul. 10, 2006

(65) Prior Publication Data
US 2008/0008210 A1     Jan. 10, 2008

(51) Int. Cl.
*H04L 12/28* (2006.01)
(52) U.S. Cl. .................. 370/231; 370/395.3; 709/228
(58) Field of Classification Search .............. 370/229, 370/282; 725/91, 111, 114, 116, 138, 146
See application file for complete search history.

(56) References Cited
U.S. PATENT DOCUMENTS
2002/0116655 A1    8/2002  Lew et al.
2006/0002294 A1*   1/2006  Chapman et al. ............ 370/229
2006/0250967 A1*  11/2006  Miller et al. ................ 370/241

FOREIGN PATENT DOCUMENTS
WO       WO 02/41642       5/2002

OTHER PUBLICATIONS

DOCSIS 2.0, Radio Frequency Interface Specification, CM-SP-RFIv2.0-I11-060602, pp. 368-375, 1999-2006.

* cited by examiner

*Primary Examiner*—Seema S Rao
*Assistant Examiner*—Wanda Z Russell
(74) *Attorney, Agent, or Firm*—Merchant & Gould

(57) ABSTRACT

Systems and methods for transmitting signals according to service flows are described herein. In one exemplary embodiment, a routing device, such a cable modem, comprises memory configured to store a configuration file. The cable modem also comprises a network port and a plurality of input ports. The network port is configured to communicate with a cable network via a cable modem termination system (CMTS). The input ports are each configured to communicate with a communication device. The configuration file includes logic for defining a service flow for data transmission on the network port based on one or more input ports.

18 Claims, 2 Drawing Sheets

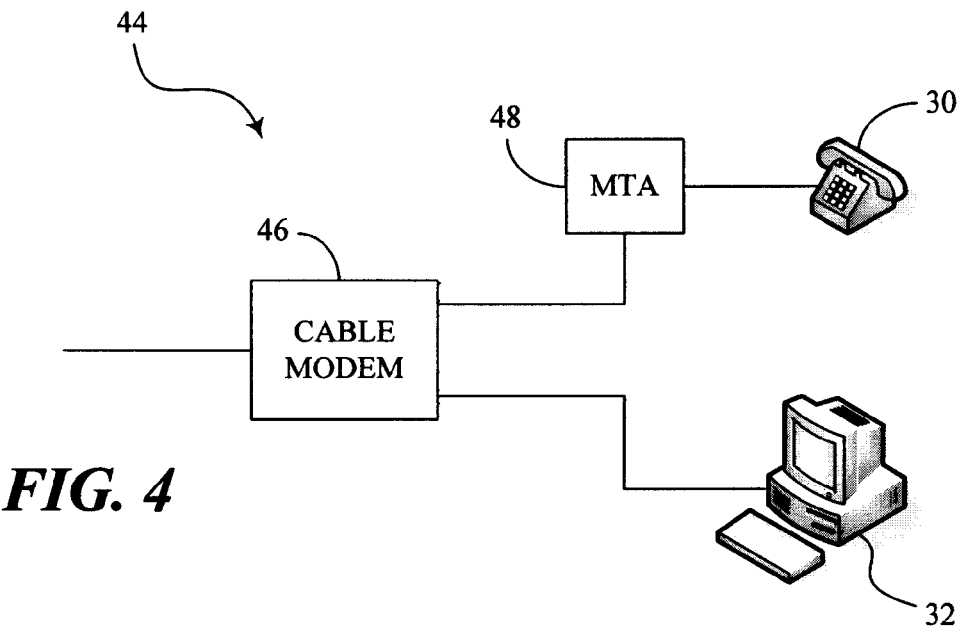
FIG. 4
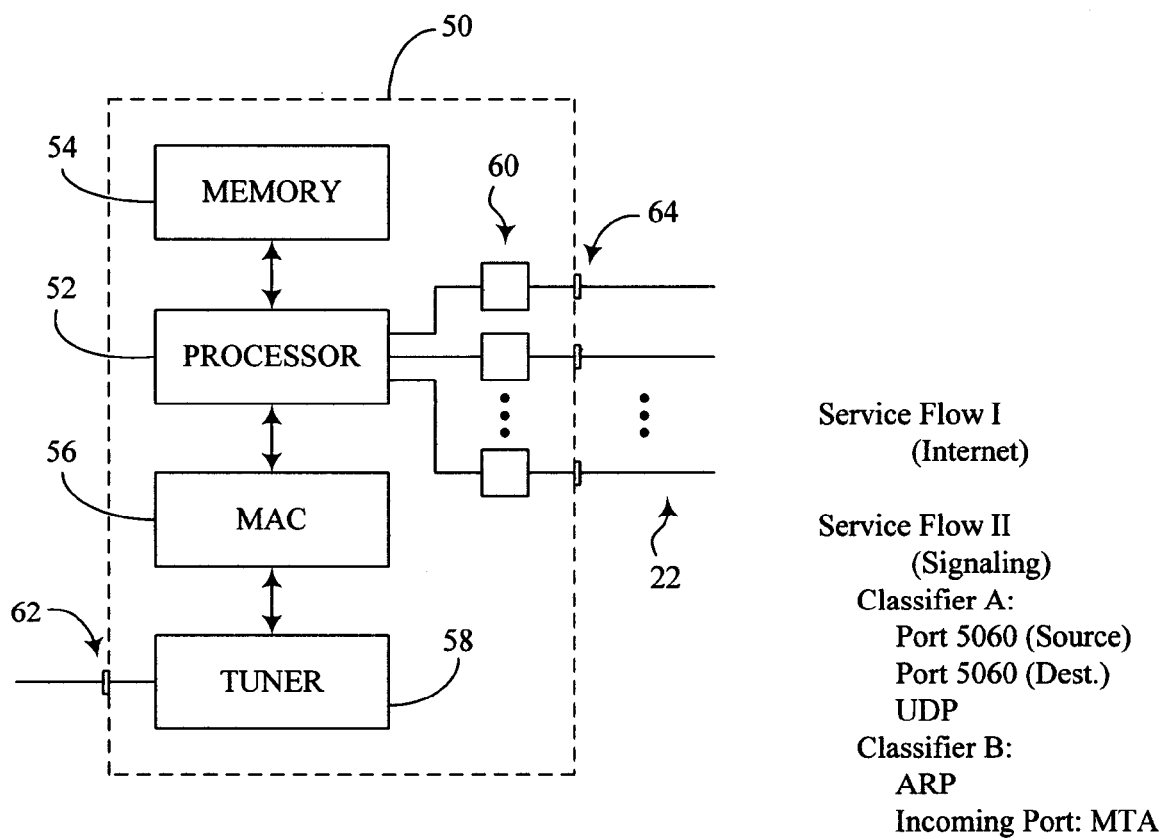
FIG. 5
Service Flow I
 (Internet)
Service Flow II
 (Signaling)
 Classifier A:
  Port 5060 (Source)
  Port 5060 (Dest.)
  UDP
 Classifier B:
  ARP
  Incoming Port: MTA
⋮
Service Flow N
FIG. 6

ENHANCING A CONFIGURATION FILE

TECHNICAL FIELD

The present disclosure generally relates to communication systems. More particularly, the present disclosure relates to enhancing the communication of various types of data.

BACKGROUND

Voice over Internet Protocol (VoIP) is a technology allowing voice information to be transmitted within packets over a data network such as the Internet. VoIP signals may be transmitted over regular telephone lines or over "cable" lines that are configured to carry cable television signals. When a personal computer (PC) is connected to the data network via a cable system, data can be transferred at a rate many times greater than the data transfer rate of regular telephone lines. With cable services, a routing device, such as a cable modem, is typically used to allow a PC at the customer premises to access the data network. The cable modem also routes telephone signal transmissions to and from a telephone at the customer premises. Cable modems typically adhere to well-defined standards, such as the Data Over Cable Service Interface Specification (DOCSIS) developed by CableLabs. The most recent version of this standard (DOCSIS 2.0) was released in January 2002.

Regarding VoIP on a cable system, a cable modem is usually configured to give voice signals priority over data or Internet Protocol (IP) signals. In this way, voice signals can be communicated quickly without noticeable delay, even if Internet traffic is heavy. The DOCSIS configuration file stored on the cable modem includes an assignment of a bit rate allocation for different types of signals and a priority list regarding what type of signal is handled before the others. The priority, among other things, is defined according to fields referred to as "service flows". Usually, a service flow defines the type of signals that may correspond to a particular customer device, e.g. a telephone, to establish a priority in which certain signals, e.g. telephone signals, are prioritized over other types of data signals. The configuration file typically defines upstream and downstream signals separately.

During a telephone call over a cable network, two (or more) telephones are linked through the network to allow telephone signals to be transmitted back and forth between the telephones. A dedicated communication path is temporarily established between the two telephone devices. To more efficiently communication along this dedicated communication path, one customer device can transmit a message known as an Address Resolution Protocol (ARP) message. ARP messages are transmitted out over the network to resolve the MAC address of another device on the network. An ARP message contains a known IP address and requests that the device having that IP address returns a message indicating its MAC address. By resolving the MAC address of the other device, the two devices can communicate with each other using MAC addresses if the two devices are on the same IP sub-net. PCs and other devices also send out ARP messages to resolve MAC addresses.

In DOCSIS, ARP messages can be defined within the configuration file stored in the cable modem. For example, ARP messages can be classified under a particular service flow. If ARP messages are classified under a service flow having a high priority, then all the ARP messages received by the cable modem will be given a high priority and will be sent within the high-priority channel, e.g. a voice (signaling) channel. On the other hand, if the ARP messages are classified under a service flow having a lower priority, then all the ARP messages received by the cable modem will be given a lower priority and will be sent within the low-priority channel, e.g. an IP channel.

One problem with this current system is that DOCSIS does not allow ARP messages to be further restricted. Therefore, if ARP messages are given a high priority, then all ARP messages, even those from the lower-priority IP sources, e.g. a PC, are sent within the high-priority channel. These lower-priority ARP messages can thus congest the high-priority channel. Another problem is that, if ARP messages are not given high priority, then high-priority ARP messages from high-priority sources, e.g. a telephone, are sent within the low-priority channel. These high-priority ARP messages can thus be delayed by Internet traffic. Neither of these consequences is desirable and thus a need exists in the industry to address these and other deficiencies and inadequacies.

BRIEF DESCRIPTION OF THE DRAWINGS

Many aspects of the embodiments disclosed herein can be better understood with reference to the following drawings. The components in the drawings are not necessarily to scale, emphasis instead being placed upon clearly illustrating the principles of the present disclosure. Like reference numerals designate corresponding parts throughout the several views.

FIG. 4 is a block diagram of a second embodiment of equipment located at a customer premises.

FIG. 5 is a block diagram of an embodiment of a cable modem.

FIG. 6 is a partial listing of an exemplary configuration file for a cable modem.

DETAILED DESCRIPTION

Figure 1:
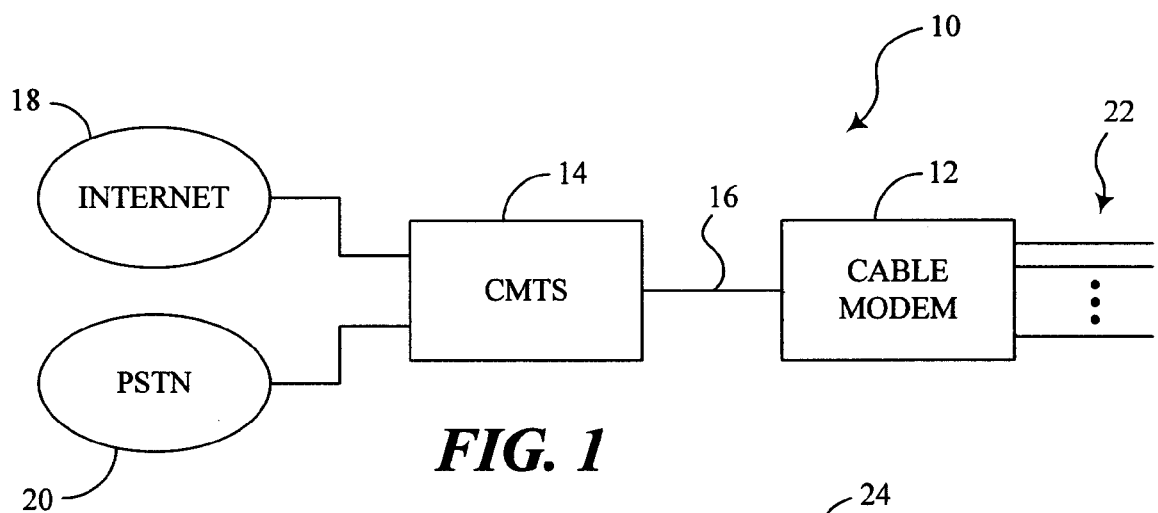
FIG. 1 is a block diagram of an embodiment of a communication system.

A number of cable systems, each serving a particular district or community, can be managed by a Multiple System Operator (MSO). An MSO typically stores one configuration file, such as a Data Over Cable Service Interface Specification (DOCSIS) configuration file, which can be downloaded to each of the cable modems operating within the system or in communication with a cable system head-end. Each cable modem stores this configuration file internally and uses it to prioritize signals based on many classifiers for each type of traffic coming from the various customer devices. Since there are many types of customer devices, the cable modem, in many embodiments, utilizes the configuration file to account for many possible types of data that the cable modem may receive.

For example, a media terminal adapters (MTA), which converts telephone signals to Voice over Internet Protocol (VoIP), typically transfers data corresponding to signaling, voice, control packets, modem control, simple network management protocol (SNMP) signals, etc. In some instances, the configuration file is very large in order to account for various devices and types of signals. One problem, however, is that the configuration file might classify too much or too little, allowing a device such as a personal computer (PC) to be given a high priority when it should be given a low priority. As a result the PC can congest the high-priority signaling pipe of the cable modem. Another problem is that MTA traffic carrying high-priority signaling can get sent along a low-priority pipe and be subjected to slow Internet traffic.

One example of a possible misallocation of signals involves the sending of Address Resolution Protocol (ARP) messages. ARP messages are transmitted to other devices on a communication network to resolve or determine the MAC address of a device having a known IP address. Since the process of transmitting and receiving ARP messages may occur quite frequently, it would be desirable to address the issue of prioritizing certain ARP messages coming only from high-priority devices. Presently, the DOCSIS standard does not include a definition for recognizing the incoming port to a cable modem. By enhancing DOCSIS, or other cable modem configuration file, to include a way to recognize the incoming port, the configuration file of a cable modem can be defined based on a classifier of a service flow for both ARP and incoming port. In this way, the cable modem can be programmed to send only ARP messages from a specific high-priority device or any device that may be connected to a specific incoming port. These high-priority ARP messages will then be transmitted within the high-priority signaling channel. If the cable modem receives an ARP message from a different incoming port, likely designating a lower-priority device, the cable modem will send it within the lower-priority channel since the ARP would normally not be recognized as coming from the specific high-priority incoming port.

By changing the DOCSIS standard to include a designation for incoming port, any cable modem that downloads the DOCSIS configuration file is able to benefit from the ability to distinguish among incoming ports. The cable modem may be designed specifically to understand this incoming port designation and then respond according to the incoming port. By enhancing the configuration file, a simplified way to prioritize can be realized without the need for detailed classifiers. If a cable modem were not equipped to understand the new incoming port classifier, according to some embodiments, it would simply ignore this classifier.

In general, the present disclosure creates an additional way in which different ports into a routing device, such as a cable modem, can be distinguished from each other. In this respect, by distinguishing between the different input ports, priority for data transfer can be better defined. By applying the teachings of the present disclosure, a router having multiple service flows can make a distinction based on incoming port.

FIG. 1 is a block diagram of an embodiment of a portion of a communication system 10 including the teachings of the present application. In this embodiment, the communication system 10 includes, among other things, a cable modem 12 and a cable modem termination system (CMTS) 14. The cable modem 12 and CMTS 14 communicate with each other via a communication link 16. The communication link 16 may include any suitable combination of transmission lines, e.g. hybrid fiber coaxial (HFC) cable, wireless links, or any suitable combination of wired and/or wireless paths. The CMTS 14 may be located at a cable service head-end and may be in communication, for example, with the Internet 18, or other data network, and the public switched telephone network (PSTN) 20, among others. The cable modem 12 is preferably located at a customer premises, such as a home, school, office, library, etc. The cable modem 12 may be connected to a number of customer devices via communication links 22. The customer devices (not shown in FIG. 1) may include, for example, telephones, wireless telephones, facsimile machines, personal computers, televisions, or other various types of communication devices.

When the cable modem 12 is first powered up or reset, it downloads the common configuration file from the CMTS 14 or other head-end device. To download the file, the cable modem 12 tunes to a particular channel to get physical parameters and determines where to find the configuration file. The cable modem 12 then tunes to a different channel if necessary and downloads the file. Once the configuration file is downloaded, the cable modem 12 configures internal buffers for different service flows to allow the cable modem 12 to send data according to service flows defined in the configuration file.

Voice signals (signaling) may be transmitted from various customer devices, i.e. telephone, facsimile machine, etc., to the cable modem 12 via the respective communication link 22. From the cable modem 12, the signaling is transmitted to the CMTS 14 within the high-priority channel on communication link 16. Then, the signals are transmitted to the PSTN 20 to other corresponding device(s) on the network. Return signals from the corresponding device(s) can take a substantially opposite path to the customer device.

Similarly, IP signals, for example, may be transmitted from a PC to the cable modem 12 via the respective communication link 22. From the cable modem 12, the IP signals are transmitted to the CMTS 14 within the lower-priority channel on communication link 16. The IP signals are then transmitted to the Internet 18 to other corresponding device(s) on the network. Again, return signals take a substantially opposite path to the customer device.

The cable modem 12 in the embodiment of FIG. 1 is programmed with a configuration file that allows the cable modem 12 to recognize one or more input ports (i.e. incoming ports). The input or incoming port to the cable modem may be a terminal, port, connector, or other suitable interface means for connection to a customer device. As mentioned above, DOCSIS does not presently take into account a classifier for incoming ports. By enhancing DOCSIS or other cable modem standard or specification, the cable modem 12 can be enabled to recognize an indication regarding the incoming port thereof. The configuration file of the cable modem 12 can be programmed to further define service flows having a classifier that is based on incoming port.

In one example in the present disclosure, the incoming port classification may be used to further specify ARP messages. As suggested above, ARP messages having an incoming port classification for a particular high-priority device can be transmitted within the high-priority signaling channel. ARP messages from other incoming ports not classified in this manner are transmitted within a lower-priority channel.

Alternative to enhancing DOCSIS to allow for incoming port classification, the cable modem 12 may be configured with a vendor specific field that instructs the cable modem 12 to consider incoming ports. By allowing incoming ports to be considered, ARP messages from a predefined incoming port can be transmitted within the high-priority channel. In addition, similar vendor specific fields can be applied to cable modems, routing devices, or other suitable types of data traffic controlling devices to classify signals based on an incoming port. Although a cable modem 12 is illustrated in the embodiment of FIG. 1, it should be recognized that the cable modem 12 may include any other suitable routing device in any communication system.

It should be recognized that the classifier for the incoming port could be used for other situations other than for further defining ARP messages. For example, the incoming port classifier may be used for other service flow criteria to simplify the service flows of the configuration file. However, in one application, ARP messages and incoming ports can be used together in a service flow in order that only ARP messages from a high-priority incoming port are transmitted with the high-priority signaling channel.

In addition, the incoming port to the cable modem 12 may be connected to any desired customer device that is to be given higher priority. The customer device connected to the specific incoming port may include a telephone, facsimile machine, or other device that may benefit from fast signal transmission.

Figure 2:
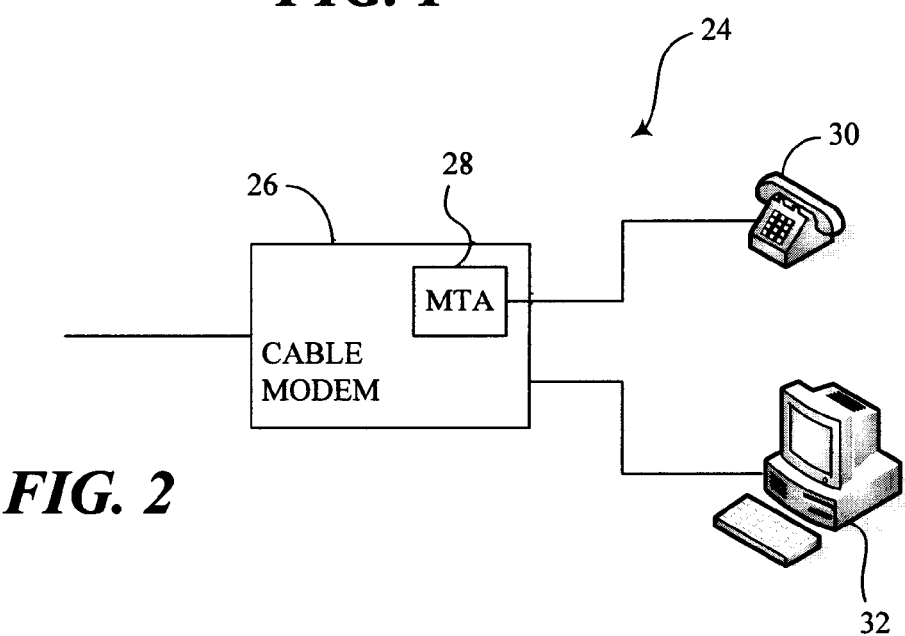
FIG. 2 is a block diagram of a first embodiment of equipment located at a customer premises.

FIG. 2 is a block diagram of an embodiment of a customer premises 24. In this embodiment, the customer premises 24 includes a cable modem 26, which may be configured similarly to the cable modem 12 shown in FIG. 1. In this example, the cable modem 26 includes a media terminal adapter (MTA) 28 for converting telephone signals from a telephone 30 into a format conforming to VoIP for transmission in digital form. More specifically, the MTA 28 in this embodiment is an embedded MTA (eMTA) that is embedded within the cable modem 26 itself. The MTA 28 may include hardware and/or software for performing the conversion to VoIP. The cable modem 26, in some embodiments, may also be connected to a personal computer 32 for communicating data to the Internet 18. The cable modem 26 may have other ports or terminals for connection to other customer devices.

Figure 3:
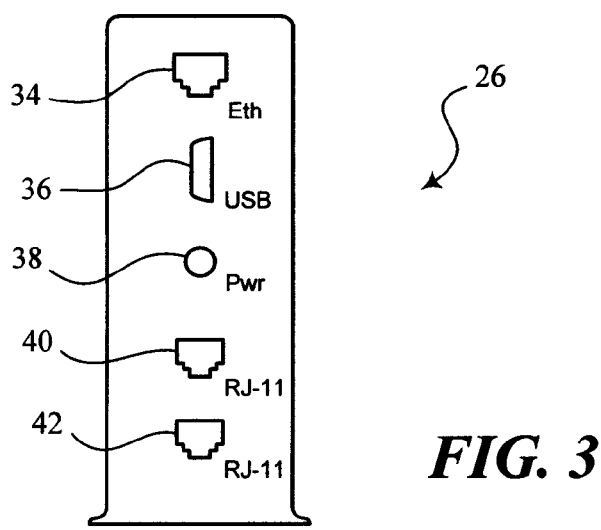
FIG. 3 is a front view of an embodiment of the cable modem shown in FIG. 2.

FIG. 3 illustrates a front view of an embodiment of the cable modem 26 having an embedded MTA 28. The cable modem 26 includes an Ethernet port 34 for connection to a PC, a universal serial bus (USB) port 36, and a power indicator 38. The MTA portion of the cable modem 26 includes two RJ11 ports 40 and 42 for connection to telephones and/or facsimile machines. It should be understood that FIG. 3 is merely an example of a possible configuration or design for a cable modem and is shown merely for illustrative purposes only. The cable modem 26 may include other configurations and layouts without departing from the spirit and scope of the present disclosure.

FIG. 4 is a block diagram of another embodiment of a customer premises 44. In this embodiment, the customer premises 44 includes a cable modem 46 and a separate MTA 48. In this example, the MTA 48 may include the same functions as the eMTA 28 but differs only in that it is not embedded within the cable modem 46 but is embodied in a separate unit. The MTA 48 communicates telephone signals from the telephone 30 to the cable modem 46. Data signals from the PC 32 are communicated directly to the cable modem 46.

FIG. 5 is a block diagram of an embodiment of a cable modem 50 and illustrates some or all of the internal components that may be representative of any or all of the cable modems 12, 26, 46. In this embodiment, the cable modem 50 includes, among other things, a processor 52, memory 54, a MAC 56, a tuner 58, and a number of interface devices 60. The cable modem 50 further includes a network port 62 for connection with a network and a number of input ports 64 for connection with customer devices (not shown). Each of the interface devices 60 is configured to interface with a respective customer device. The tuner 58 may be connected via the network port 62 to a cable outlet, which is connected, for example, to a head-end, such as the CMTS 14. In some embodiments, the cable modem 50 can be incorporated within a computer or set-top box or it may be configured as a stand-alone unit.

The tuner 58 is able to tune the cable modem 50 to a particular channel with respect to the CMTS 14 to download the configuration file, which the processor 52 stores in memory 54. The processor 52 can access the configuration file in memory 54 to determine service flow criteria for controlling the priority for signals being sent from the network port 62. The interface devices 60 may optionally include an eMTA for handling telephone signal interfacing or may interface with an external MTA. The interface devices 60 may also include devices for communication with PCs or other types of processing devices.

FIG. 6 is a portion of an exemplary listing of code that may be stored in a configuration file for defining "service flows" of a cable modem. The service flows define the flow allocation of different types of signals. The service flows can include a predetermined priority for the different types of signals for transmission within respective channels of the communication line 16. In the present disclosure, a service flow refers to an identification or definition of particular types of data flow. The service flow can identify or define upstream or downstream data flow. The service flow may define a Quality of Service (QoS) for different services handled by the cable modem in order to establish priority among the customer devices at the customer premises. The customer devices may be uniquely identified by an identification number or may be identified based on the incoming port. Each service flow may include characteristics of the data flow, such as bit rate, priority with respect to other service flows, maximum packet length, etc.

In the example of FIG. 6, the code includes a "Service Flow I" that defines, in this example, the data traffic allocated for Internet transmission. In this example, the IP signals are given a low priority with respect to telephone signaling as defined by the priority parameter defined by other service flows. Under Service Flow II, signaling is defined. Particularly, the signaling service flow includes classifiers that define, among other things, the source and destination ports that are used by the high-priority customer devices. In the example of FIG. 3, the RJ11 ports, e.g. ports 5060, are identified as being included or classified within the signaling service flow (Service Flow II) for source and destination ports. In this example, a user datagram protocol (UDP) device may also be included in the Service Flow II.

When the cable modem 50 receives packets from an MTA or other recognized high-priority device, the processor 52 checks to see if the MTA matches Classifier A with respect to the source or destination port classifier and UDP classifier. If so, the data from this device is transmitted over the signaling channel. If not, then the data is transmitted over the IP channel.

The Service Flow II also includes a classifier (Classifier B) for defining ARP messages. Instead of merely defining the service flow to transmit all ARP messages within the high-priority channel, the classifier is further defined to include an identification of a particular incoming port. The incoming port in this example identifies the MTA port, or, in other words, the customer device connected to the MTA. Preferably, a telephone or facsimile machine is connected to the MTA incoming port, which may include one of the RJ11 ports 40 or 42 shown in FIG. 3, for example. If data is identified as being ARP and matches the specific incoming port, such as the MTA port, for example, then these ARP messages coming from the MTA will also be transmitted over the signaling channel under Service Flow II.

By including both "ARP" and "incoming port: MTA" within the same classifier, when the cable modem, according to some embodiments, identifies both conditions as being valid or true, then the ARP message is included within the signaling service flow. For example, if an ARP message is received from a source other than the MTA incoming port, then this ARP message does not receive the high-priority classification. In this case, only the ARP messages that are received from the MTA incoming port are prioritized. Of course "incoming port: MTA" is merely an example and could be changed to identify any incoming port of the cable modem, including, for example, "incoming port: wireless telephone", "incoming port: USB", "incoming port: Ethernet", etc.

As an example, the code of FIG. 6 may be part of the DOCSIS configuration file. In this case, an incoming port classification can be added to the DOCSIS configuration file allowing cable modems adhering to this protocol to identify customer devices based on the incoming port. ARP messages and the incoming port classification can be used together to better distribute ARP messages according to desirable prioritization. As mentioned above, the addition to DOCSIS to include incoming ports can be used in other configurations other than merely an association with ARP messages.

In some embodiments, the code of FIG. 6 may be incorporated into a configuration file of a vendor specific field. In this case, the field includes an identification of a specific incoming port. Vendor specific fields can be added for a new product, allowing the new product to identify or define an incoming port. A cable modem, for example, can be designed to read and understand the classifier in the configuration file regarding incoming port. If an existing cable modem does not know and/or recognize the particular classifier, it can simply ignore it. The recognition of incoming port may also be defined within a simple network management protocol (SNMP) object or field.

By structuring the configuration files of cable modems or other routing or controlling device to include a designation for incoming port, specific instructions can be simplified. For example, instead of requiring a programmer to identify all makes and models of telephones or other customer devices that may be connected to the MTA or according to MAC addresses, whatever telephone device is connected to the MTA incoming port can be easily identified and defined. Including such a designation greatly simplifies the service flow definitions and broadens and enhances the ability of cable modems that include the configuration files to perform certain tasks more easily and with fewer code entries.

Different portions of the logic embodied in the cable modem systems described in the present disclosure can be implemented in hardware, software, firmware, or a combination thereof. In the disclosed embodiments, the configuration file stored in the cable modem is implemented in, or used by, software or firmware that is stored in a memory and that is executed by a suitable instruction execution system. If implemented in hardware, portions of the cable modem can be implemented with any or a combination of the following technologies: discrete logic circuitry having logic gates for implementing logic functions upon data signals, an application specific integrated circuit (ASIC) having appropriate combinational logic gates, a programmable gate array (PGA), a field programmable gate array (FPGA), etc.

Configuration files, which are stored in the cable modem, are described in the present application. These configuration files, which comprise, or can be used by, an ordered listing of executable instructions for implementing logical functions, can be embodied in any computer-readable medium for use by an instruction execution system, apparatus, or device, such as a computer-based system, processor-controlled system, or other system that can fetch the instructions from the instruction execution system, apparatus, or device and execute the instructions. In the context of this document, a "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium.

It should be understood by one of ordinary skill in the art that the direction of transmission of signals as described in the present disclosure is not limited merely as described but may be reversed and is merely for illustrative purposes. It should be noted that some signals are transmitted from the customer devices, e.g. telephone 30 and PC 32, to the CMTS 14 via the cable modem 12, 26, 46, 50. The CMTS 14 then distributes the signals to other networks, e.g. the Internet 18 or PSTN 20. Also, some signals from the networks, e.g. the Internet 18 and the PSTN 20, are transmitted to the CMTS 14 and then distributed accordingly to the customer device 30 and 32, or other devices, via the cable modem 12, 26, 46, 50.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A cable modem comprising:
   memory configured to store a configuration file;
   a network port configured to communicate with a cable network via a cable modem termination system (CMTS);
   a plurality of input ports, each input port configured to communicate with a communication device, wherein the configuration file includes logic for defining a service flow for data transmission on the network port based on one or more input ports wherein both data and address resolution protocol (ARP) messages are serviced according to said service flow for data transmission on the network port based on the one or more input ports;
   applying a first classifier within the service flow, the classifier including a first field based on a one of the plurality of input ports to a routing device; and
   applying a second field to the first classifier, the second field based on an identification of an ARP message, wherein ARP messages from the one of the plurality of input ports are classified according to the first classifier.

2. The cable modem of claim 1, wherein the configuration file is downloaded from a head-end device.

3. The cable modem of claim 2, wherein the head-end device is the CMTS.

4. The cable modem of claim 1, wherein the configuration file is included within a Data Over Cable Service Interface Specification (DOCSIS) configuration file.

5. The cable modem of claim 1, wherein the communication devices include one or more devices selected from the group consisting of telephones, facsimile machines, personal computers, wireless telephones, and televisions.

6. The cable modem of claim 1, wherein the configuration file further includes logic for defining a high-priority service flow for data transmission on the network port based on an input port from a media terminal adapter (MTA).

7. A method of enhancing the functionality of a configuration file, the method comprising:
   providing a configuration file defining multiple service flows, the service flows establishing a priority of bandwidth allocation along a communication path;
   applying a first classifier within one of the service flows, the classifier including a first field based on an incoming port to a routing device;
   applying a second field to the first classifier, the second field based on an identification of an address resolution protocol (ARP) message, wherein ARP messages from the incoming port are classified according to the first classifier; and
   servicing a customer device in communication with the incoming port according to the service flow priority wherein both data corresponding to the incoming port and the ARP messages corresponding to the incoming port are serviced according to said one of the service flows.

8. The method of claim 7, wherein providing a configuration file further comprises providing a configuration file associated with a standard regarding data over cable systems.

9. The method of claim 8, wherein the standard is related to Data Over Cable Service Interface Specification (DOCSIS).

10. The method of claim 7, wherein the configuration file is associated with a vendor specific field.

11. The method of claim 7, wherein the configuration file is associated with a Simple Network Management Protocol (SNMP) object.

12. The method of claim 7, establishing a high priority for a service flow for a customer device connected to the incoming port via a media terminal adapter (MTA).

13. The method of claim 12, wherein the customer device is a telephone or facsimile machine.

14. The method of claim 7, further comprising downloading the configuration file from a cable modem termination system (CMTS), wherein the routing device is a cable modem.

15. A Voice over Internet Protocol (VoIP) routing device configured to operate according to a configuration file, the configuration file comprising:
   a plurality of service flows, each service flow defining a priority related to data transmission from the VoIP routing device to a head-end; and
   a classifier associated with a first service flow of the plurality of service flows, said first service flow including;
      a first field related to an incoming port from a communication device to the VoIP routing device, and
      a second field related to an Address Resolution Protocol (ARP) message, wherein the classifier includes the second field allowing ARP messages from the communication device to be transmitted according to said first service flow;
   wherein data from the communication device and the ARP messages from the communication device are transmitted by the VoIP routing device according to said first service flow.

16. The VoIP routing device of claim 15, wherein the communication device is a telephone.

17. The VoIP routing device of claim 16, further comprising a media terminal adapter (MTA) embedded therein, wherein the telephone communicates with the VoIP routing device via the MTA.

18. The VoIP routing device of claim 16, wherein the telephone communicates with the VoIP routing device via a media terminal adapter (MTA) that is separate from the VoIP routing device.

* * * * *